United States Patent [19]

Hacha

[11] 4,400,446
[45] Aug. 23, 1983

[54] HALOGEN HYDRATE STORAGE DEVICE FOR MOBILE ZINC-CHLORIDE BATTERY SYSTEMS

[75] Inventor: Thomas H. Hacha, Troy, Mich.

[73] Assignee: Energy Development Associates, Inc., Madison Heights, Mich.

[21] Appl. No.: 357,742

[22] Filed: Mar. 12, 1982

[51] Int. Cl.³ .......................................... H01M 8/18
[52] U.S. Cl. .................................... 429/19; 429/105
[58] Field of Search ................. 429/101, 51, 17, 19, 429/105

[56] References Cited

U.S. PATENT DOCUMENTS

| | | | |
|---|---|---|---|
| 3,713,888 | 1/1973 | Symons | 136/6 |
| 3,809,578 | 5/1974 | Symons | 136/6 E |
| 3,814,630 | 6/1974 | Bjorkman | 136/86 A |
| 3,993,502 | 11/1976 | Bjorkman | 429/51 |
| 4,146,680 | 3/1979 | Carr et al. | 429/101 |

Primary Examiner—Donald L. Walton
Attorney, Agent, or Firm—Harness, Dickey & Pierce

[57] ABSTRACT

A metal halogen battery system, said system having the following construction, a store means constructed in the form of a container which includes a generally unitary filter means extending around most of the inside surface of the container and with the filter means being spaced a predetermined distance away from said surface to form spacing between the filter means and the inside surface, said filter means being operative to separate the hydrate formed from the liquid electrolyte, a hydrate former-gas pump means associated with the store means and being operative to intermix halogen gas from the battery cell with aqueous electrolyte from the store means and from the cell, a gas space means being maintained at the top of the store means with the hydrate former-pump means exhausting into the proximity of the gas space, said gas space means being operative to reduce transfer of liquid from the store to the cell, exit conduit means generally adjacent the top of the store means for transmitting fluid containing halogen gas to the cell, and second exit conduit means generally adjacent the bottom of the store means for recirculating filtered electrolyte to the battery system.

10 Claims, 3 Drawing Figures

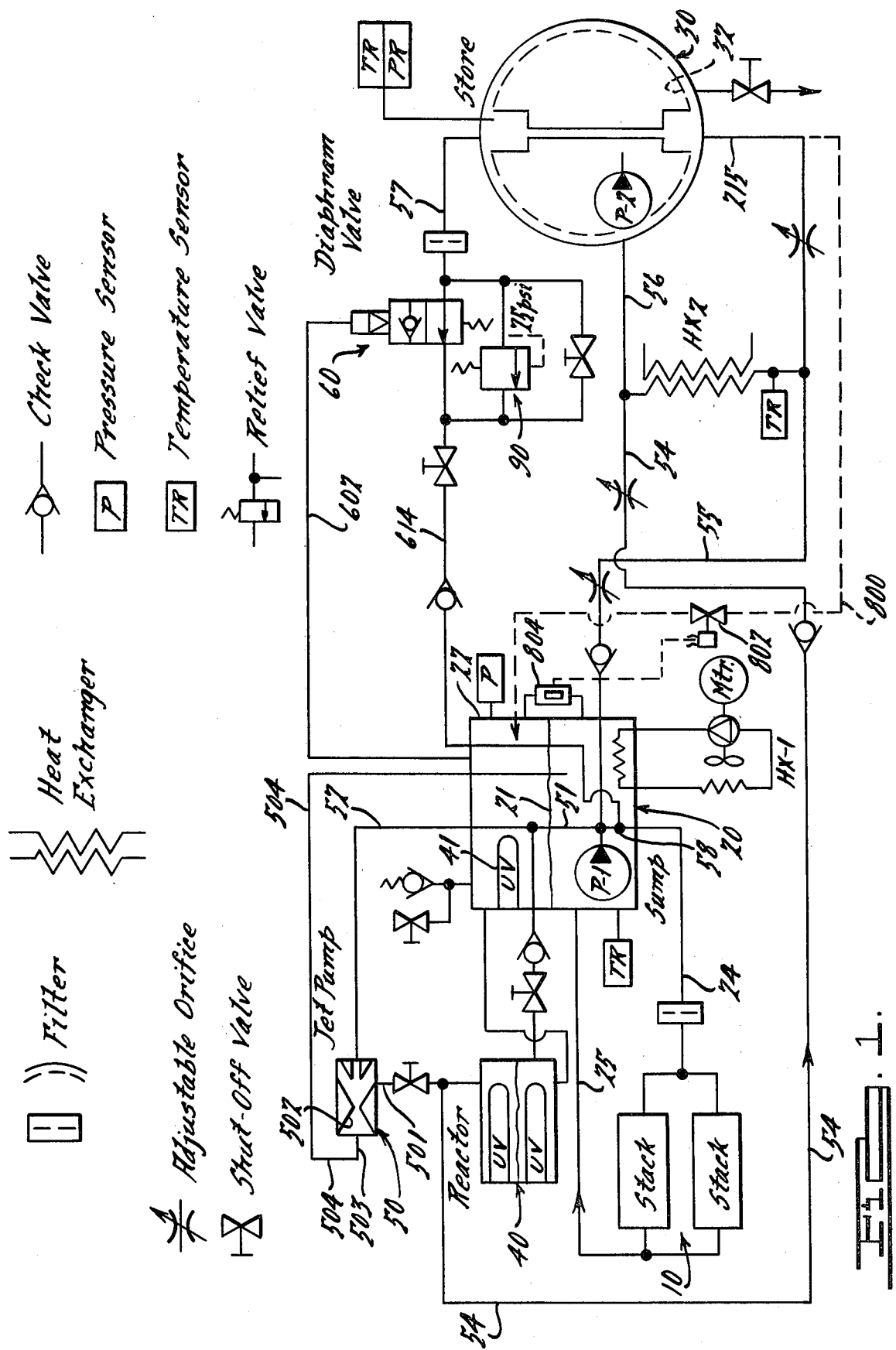

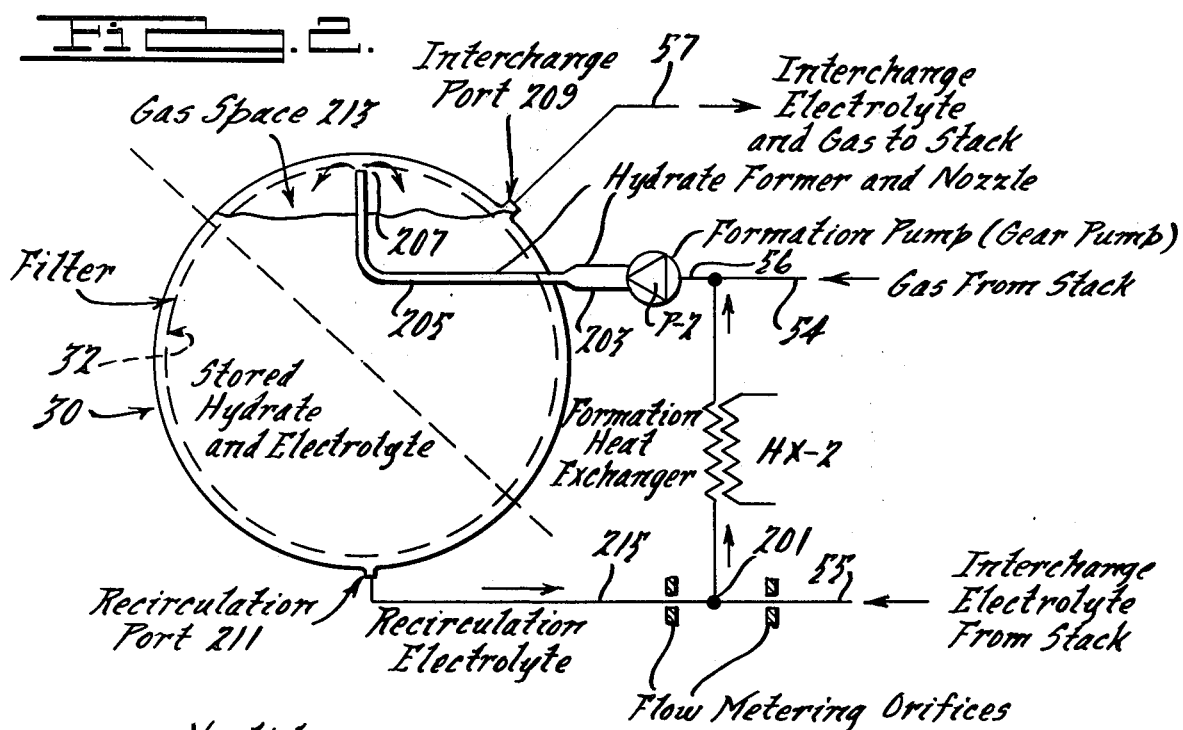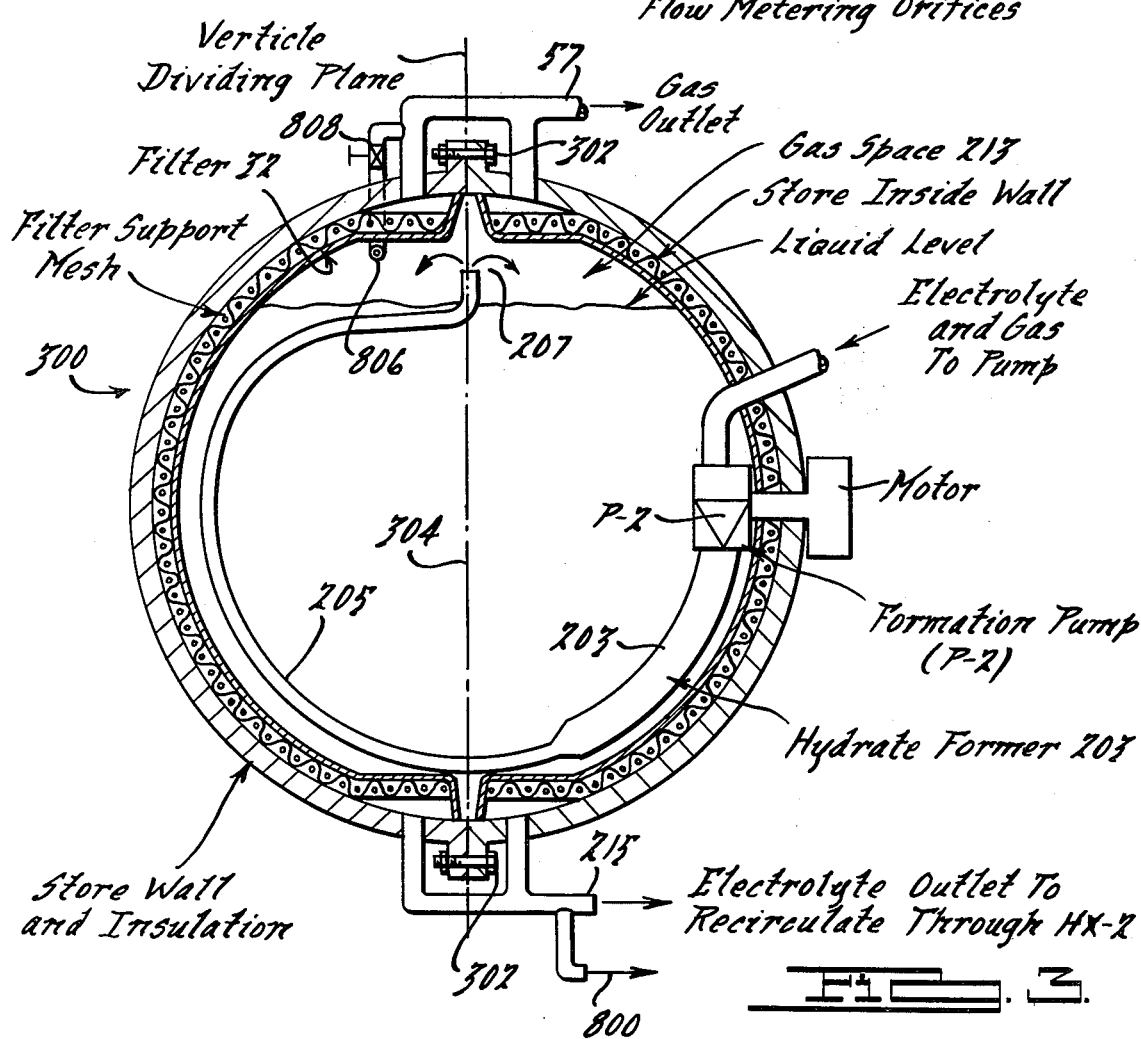

HALOGEN HYDRATE STORAGE DEVICE FOR MOBILE ZINC-CHLORIDE BATTERY SYSTEMS

BACKGROUND OF THE INVENTION

The present invention relates to improvements in metal halogen battery systems. More particularly the invention relates to a new hydrate storage device for zinc-chloride battery systems. The invention herein is particularly useful for mobile battery applications, e.g., for electric vehicles.

The electrical energy storage systems of the type referred to herein (e.g., a zinc chlorine battery system or other metal-halogen battery system) utilize a halogen hydrate as the source of a halogen component for reduction at a normally positive electrode, and an oxidizable metal adapted to become oxidized at a normally negative electrode during the normal discharge of the storage system. An aqueous electrolyte is employed for replenishing the supply of the halogen components as it becomes reduced at the positive electrode. The electrolyte contains the dissolved ions of the oxidized metal and the reduced halogen and is circulated between the electrode area and a storage area containing halogen hydrate, which progressively decomposes during a normal discharge of the electrical energy system, liberating additional elemental halogen to be consumed at the positive electrode.

The state of the art in electrical energy storage systems or battery systems of this type is described in patents owned by the same assignee as the present invention, such as Symons U.S. Pat. No. 3,713,888; Symons U.S. Pat. No. 3,809,578 entitled "Process for Forming and Storing Halogen Hydrate in a Battery"; and Bjorkman U.S. Pat. No. 3,814,630 entitled "Filter/Store For Electric Energy Storage Device"; and, in commonly assigned copending Bjorkman U.S. patent application Ser. No. 368,892 filed Apr. 16, 1982. Such systems are also described in published reports prepared by the assignee herein such as "Zinc-Chloride Electric Engine Unit For Four Passenger Electric Vehicle" by J. Kiwalle et al. of Energy Development Associates. The specific teachings of the aforementioned cited reference are incorporated herein by reference. Reference is also made to commonly assigned copending application Ser. No. 343,904 filed Jan. 29, 1982 entitled "Metal Halogen Battery System", the disclosure of which is incorporated herein by reference.

The basic operation of a zinc chloride battery system is as follows. In charge, an electrolyte pump delivers aqueous electrolyte to pockets between pairs of porous graphite-chlorine electrodes in a battery stack comprised of a plurality of cells. The electrolyte passes through the porous chlorine electrodes into a chamber between opposite polarity electrodes, flows up between the electrodes, then flows back into the battery sump. Chlorine gas liberated from porous graphite electrode substrates is pumped by a gas pump, and before entering the gas pump, the chlorine is mixed with electrolyte chilled by a chiller unit. The chlorine and chilled electrolyte are mixed in the gas pump, chlorine hydrate forms, and the chlorine hydrate-electrolyte mixture is deposited in the store. In discharge, chlorine is liberated from hydrate by decomposition of chlorine hydrate in the store by injection of warm electrolyte from the sump. On development of the required chlorine gas pressure in the store, the chlorine is injected and mixed with and dissolved in the electrolyte, which is then fed to the porous electrodes in the battery stack. The battery stack is then discharged, wherein the electrode dissolution of zinc occurs at the zinc electrode, reduction of the dissolved chlorine occurs at the chlorine electrode, power is available from the battery terminals, and zinc chloride is formed in the electrolyte by reaction of zinc and chlorine to form zinc chloride.

There have been certain weaknesses in prior systems directed toward hydrate storage devices for mobile metal halogen battery applications. For example, prior designs and concepts for hydrate storage in mobile systems employed multiple nozzles and multiple filters that are staged for operation at various pressures, and various liquid/gas separation methods. Although these prior designs accomplished reasonably effective hydrate storage, they also had operational shortcomings as applied to mobile applications. These shortcomings were: (1) excessive liquid transfer from the hydrate store to the stack compartment during the charge cycle resulting in flooding of the stack sump; (2) insufficient gas-liquid separation resulting in periodic gas-out of the hydrate formation pump; (3) the multiple nozzles concept employed resulted, in many instances, in partial plugging which resulted in operational difficulties and reduced hydrate storage density; and, (4) staged multiple filters increased the functional complexity of the prior devices and also led to improper liquid separation and gassing problems.

Accordingly it is one object of this invention to provide a novel and unique halogen hydrate storage device for mobile battery systems. Other objects, features and advantages of the invention will become apparent from the description herein, from the drawings, and from the appended claims.

BRIEF DESCRIPTION OF THE DRAWINGS

FIG. 1 illustrates a schematic of the halogen hydrate storage device in accordance with the invention herein, with the device being shown installed in a schematic battery system;

FIG. 2 illustrates a more detailed drawing of hydrate storage device of FIG. 1; and FIG. 3 illustrates a different embodiment of a hydrate store device in accordance with the invention.

SUMMARY OF THE INVENTION

The invention herein is concerned with a novel metal halogen battery system which includes a new and unique halogen hydrate store. The technique of the present invention differs from other store concepts in that: (1) A single or generally unitary functional filter arrangement is employed with recirculation liquid generally leaving the store at the bottom thereof. This effects good liquid-gas separation and prevents gas-out in the hydrate formation pump, as well as reducing the design complexity. (2) A significant gas space is maintained at the top of the store with the hydrate forming gas pump exhausting into the gas space. This reduces store to stack liquid transfer without reducing the hydrate storage capability. (3) A hydrate former with a single nozzle design may be employed which provides good hydrate formation characteristics and reduces operational problems inherent in multiple nozzles.

DESCRIPTION OF PREFERRED EMBODIMENTS

The drawing FIG. 1 illustrates a schematic of a zinc-chlorine battery system wherein means are provided to achieve the desired flows of chlorine, electrolyte, and heat. The zinc-chloride battery consists of three basic parts, the stack, the sump, and the store, as shown in FIG. 1. The stack 10 consists of a plurality of cells made up, for example, of solid-graphite zinc electrodes and porous-graphite chlorine electrodes. Each cell has the potential of two volts (thus giving a stack arrangement with 60 cells a 120-volt potential). The sump means is designated 20 and is comprised of an electrolyte reservoir 22 and the electrolyte pump P-1 to circulate the electrolyte 21.

The novel halogen hydrate store means is designated 30 and includes a gas pump P-2 and a generally unitary filter means 32. The store functions to store the chlorine reactant in the form of chlorine hydrate, which is a brilliant yellow solid that decomposes to chlorine gas and electrolyte at temperatures above 9.6° C. at ambient atmospheric pressure.

The centrifugal pump P-1 circulates the electrolyte 21 from the reservoir 22 to the individual porous electrodes (not shown) in the stack through the conduit 24, from which electrolyte returns to the reservoir through the conduit 25. The small quantity of hydrogen evolved during battery operation is combined with the chlorine in an ultraviolet light-activated reactor designated 40 to form hydrogen chloride, which is subsequently returned to the electrolyte reservoir as will be described herein.

As shown, there are two locations of ultraviolet lights, one inside the reservoir gas space indicated at 41, with the U.V. light 41 being activated during charge only; and, two more U.V. lights inside reactor 40 which are activated both during charge and discharge of the battery. In order to generate suction within the reactor 40 necessary to induce flow of gas from reservoir 22 into the reactor 40 and back into reservoir 22, a jet pump construction designated 50 is employed. A small quantity of electrolyte from electrolyte pump P-1 is diverted into the jet pump 50 through the conduits 51,52 to act as a driving force for the jet pump. When the electrolyte pump P-1 is in operation, the stream of liquid electrolyte passing through the jet pump from conduit 52 causes a suction whereby the gases from the reservoir 22 and from the upper part of the reactor 40 and drawn into the jet pump through the conduit 501, and the gases are then mixed in with the liquid stream exiting from the nozzle 502 near the point 503. Thereafter the intermixture of gas and liquid is returned to the sump 20 via the conduit 504.

Battery Charging

During charge of the battery system, chlorine is liberated from the porous-graphite chlorine electrode substrates, while zinc is deposited on the solid-graphite electrodes. The chlorine which is liberated in the stack 10 is subsequently drawn through conduit 54 to the store 30 via the vacuum created by the gas pump P-2 within the store 30. The heat exchanger HX-1 operates to provide cooling for the electrolyte in the sump during operation of the battery.

A small amount of electrolyte, from the output of the centrifugal pump P-1, is also diverted through conduit 55 to heat exchanger HX-2 and chilled to approximately 0° C. This chilled electrolyte contacts chlorine gas (via conduit 54) drawn from the stack by the vacuum at the intake 56 to the gas pump P-2, and chlorine hydrate is formed at the outlet port of pump P-2. Hydrate is filtered-out in the store in a fashion similar to a filtering press by the filter means 32.

The formation of chlorine hydrate from the aqueous electrolyte leads to an increasing concentration of zinc chloride within the store 30, and the electrolysis of the zinc chloride in the stack 10 reduces the zinc-chloride concentration in it. Therefore, by interchanging electrolyte between the stack and store, the use of zinc chloride is optimized in the system. The electrolyte interchange between the stack 10 and store 30 is accomplished by pumping warm electrolyte (about 30° C.) via the centrifugal pump P-1 and conduit 55 from the sump reservoir 22 into the store 30, and returning cold electrolyte (about 0° C.) through conduit 57 from the store 30 to the stack at point 58 on the high pressure side of pump P-1, and then via conduit 24 to the stack 10. The flow rates of both solutions are approximately equal. If the fluid flow pressure in conduit 57 exceeds approximately 25 psia then the fluid by-passes valve 60 and flows through the relief valve 90 to conduit 614 which leads to the high pressure side of the electrolyte pump P-1 at point 58.

System pressure during charge represents a balance between the rate of chlorine generation and the rate of hydrate formation. Therefore, when the stack pressure increases above a predetermined level, more coolant is required for hydrate formation and vice versa.

Battery Discharge

During discharge, drop in pressure inside store 30 starts gear pump P-2 injecting warm electrolyte from the reservoir (through pump P-1, conduit 55 and HX-2) until desired store pressure is restored. This action decomposes a portion of the chlorine hydrate within the store, thereby liberating chlorine and increasing the internal pressure in the store. This chlorine is injected into the discharge port of the centrifugal pump P-1 at point 58, and then circulated through the stack. Control is maintained by monitoring the pressure of the store, which indicates the balance between the rate of chlorine consumption in the stack and the rate of chlorine decomposition in the store. This, in turn, is controlled by the rate of injecting warm electrolyte into the store.

The demand for power from the battery can change rapidly but due to the large thermal mass within the store, evolution of chlorine tracks demand only approximately. Therefore a diaphragm operated, 2-position-unidirectional flow valve is utilized as designated at 60 with the valve being normally in the closed position. This pressure sensitive valve 60 forms no part of the present invention, however, it is shown in more detail in commonly assigned copending application Ser. No. 343,904, which is incorporated herein by reference. The valve is constructed as a variant of spool valve, and it provides for close control of chlorine demand and bubble tight isolation of the store from the stack. A large demand of power from the battery will result in a large demand of chlorine, and this will lower the pressure in the reservoir 22. The reservoir pressure is fed to the valve 60 through the conduit 602. The diaphragm (not shown) of the valve 60 is acted upon by reservoir pressure, and ambient atmospheric pressure also operates on the valve diaphragm. Lowering of the pressure in reservoir 22 below ambient atmospheric pressure causes opening of the valve 60, and this allows chlorine from the store via conduit 57 to be transmitted through conduit 614 to the discharge side of pump P-1 at point 58. When store pressure exceeds ambient atmospheric pressure, valve 60 shuts tight.

The FIG. 2 drawing represents the store 30 (of FIG. 1) in a battery system during charge. During charge, filtered store recirculation electrolyte is metered from the lower portion of the store 30 and mixed with metered interchange electrolyte from the stack at 201. The mixture is cooled in the heat exchanger HX-2 and enters the formation pump P-2 along with the chlorine gas generated in the stack for storage. The liquid-gas mixture is pumped into the hydrate former 203 and nozzle 205 where chlorine hydrate is formed. The liquid-solid slurry along with residual chlorine gas and inert gases are discharged into the maintained gas space at the top of the store at 207. The solid hydrate is filtered out and stored within the filter 32 and the excess gas and liquid pass through the filter. The excess gas and interchange liquid return to the stack through the upper interchange port 209 and the recirculation liquid returns to the pump through the lower recirculation port 211. Excessive liquid transfer, if permitted, from the store to the stack causes filling of the stack sump with liquid which results in severe operational difficulties. This liquid transfer is due to liquid displacement in the store by inert and chlorine gas bubbles trapped in the store by the hydrate mass or cake during battery charging. With the nozzle 205 discharging into the gas space 213 at the top of the store, good gas separation is achieved, gas entrapment is minimized and excessive liquid transfer to the stack is prevented. In one possible embodiment of the invention, the volume of the gas space 213 is achieved by placing the interchange port 209 the desired distance below the top of the store. Excessive gas entering the pump P-2 via the recirculation electrolyte line 215 results in reduced formation capabilities and possible gassing out of the pump. The placement of the recirculation port 211 at the bottom of the store 30 maximizes gravity gas-liquid separation and minimizes gas flow in the recirculation line 215. The gas space 213 at the top of the store does not reduce total hydrate storage volume. As the battery charge proceeds to completion, the hydrate density is increased throughout the entire store and the gas space eventually fills with hydrate.

The alternative embodiment of FIG. 3 (wherein like numerals indicate like elements) shows another form of hydrate storage device 300 in accordance with the invention. The device is spherical in shape with the two halves being held together by a plurality of bolts such as at 302, and the inside wall diameter of the store 300 is approximately 28½ inches, with the inside diameter of the filter 32 being approximately 27⅞ inches, and the vertical dividing line being shown at 304. The store 300 is quite similar in operation to the store 30 except that in the store 300 the liquid level is maintained by an additional conduit 800 which communicates with the battery sump 20. Conduit 800 is also shown by dotted lines in FIG. 1, and liquid flow through conduit 800 to the sump 20 is controlled by the normally closed solenoid valve 802 which is opened by the sump liquid level sensor 804 when the sump liquid drops below a predetermined level to thereby cause a transfer of electrolyte liquid from the store 300 over to the sump 20. In addition the outlet line 57 from the store 300 operates to transfer essentially only halogen gas back to the high pressure side of the electrolyte pump P-1 at point 58.

This gas transfer is facilitated by the conduit 806 and valve 808 which is opened during discharge of the battery system. Such a conduit-valve arrangement can also optionally and preferably be used during discharge in the store device 30 (of FIG. 2).

The store device of FIG. 2 has been used in a battery system to power a full size 4-door automobile and it has performed very satisfactorily in numerous miles of test driving. The store device of FIG. 3 has been incorporated, and has tested out very satisfactorily, in a fully built operational battery system in a test room at the assignee's plant.

While it will be apparent that the preferred embodiments of the invention disclosed are well calculated to fulfill the objects, benefits, and advantages of the invention, it will be appreciated that the invention is susceptible to modification, variation and change without departing from the proper scope or fair meaning of the subjoined claims.

What is claimed is:

1. In a metal halogen battery system, including at least one cell having a positive electrode and a negative electrode contacted by aqueous electrolyte containing the material of said metal and halogen, sump means for the electrolyte, store means whereby halogen hydrate is formed and stored as part of an aqueous material, means for circulating electrolyte through the cell and to the store means, and conduit means for transmitting halogen gas formed in the cell to a hydrate former whereby the hydrate is formed in association with the store means, the improvement comprising, said store means being constructed in the form of a container which includes a generally unitary filter means extending around most of the inside surface of the container and with the filter means being spaced a predetermined distance away from said surface to form spacing between the filter means and said inside surface, said filter means being operative to separate the hydrate formed from the liquid electrolyte, a hydrate former-gas pump means associated with the store means and being operative to intermix halogen gas from the cell with aqueous electrolyte from the store means and from the cell, a gas space means being maintained at the top of the store means with the hydrate former-pump means exhausting into the proximity of the gas space, said gas space means being operative to reduce transfer of liquid from the store to the cell, exit conduit means generally adjacent the top of the store means for transmitting fluid containing halogen gas to the cell, second exit conduit means generally adjacent the bottom of the store means for recirculating filtered electrolyte to the battery system.

2. The invention of claim 1 wherein,
said battery is a zinc-chlorine battery using an aqueous zinc chloride electrolyte.

3. The invention of claim 2 wherein,
said store means is substantially spherical in shape.

4. The invention of claim 2 wherein,
said store means operates to provide good liquid/gas separation with recirculating liquid electrolyte essentially leaving the store at the bottom and gas leaving at the top, to thereby assist in preventing gassing-out of said pump means.

5. The invention of claim 2 wherein, said gas space means maintained at the top of the store operates to prevent gas build-up in the middle of the store thus preventing store liquid from being prematurely forced over to the cell.

6. The invention of claim 4 wherein,
said gas space means maintained at the top of the store operates to prevent gas build-up in the middle of the store thus preventing store liquid from being prematurely forced over to the cell.

7. In a metal halogen battery system, including at least one cell having a positive electrode and a negative electrode contacted by aqueous electrolyte containing the material of said metal and halogen, sump means for the electrolyte, store means whereby halogen hydrate is formed and stored as part of an aqueous material, means for circulating electrolyte through the cell and to the store means, and conduit means for transmitting halogen gas formed in the cell to a hydrate former whereby the hydrate is formed in association with the store means, the improvement comprising,
said store means being constructed in the form of a container which includes a generally unitary filter means extending around most of the inside surface of the container and with the filter means being spaced a predetermined distance away from said surface to form spacing between the filter means and said inside surface,
said filter means being operative to separate the hydrate formed from the liquid electrolyte,
a hydrate former-gas pump means associated with the store means and being operative to intermix halogen gas from the cell with aqueous electrolyte,
a gas space means being maintained at the top of the store means with the hydrate former-pump means exhausting into the gas space, said gas space means being operative to minimize transfer of liquid from the store to the cell,
exit conduit means generally adjacent the top of the store means for transmitting fluid containing halogen gas to the cell,
second exit conduit means generally adjacent the bottom of the store means for recirculating filtered electrolyte to the battery system.

8. The invention of claim 7 wherein,
said battery is a zinc-chlorine battery using an aqueous zinc chloride electrolyte.

9. In a metal halogen battery system, including at least one cell, electrolyte, store means whereby halogen hydrate is formed and stored, means for circulating electrolyte through the cell and to the store means, and conduit means for transmitting halogen gas to a hydrate former, the improvement comprising,
said store means being constructed in the form of a container which includes a filter means extending around most of the inside of the container,
said filter means being operative to separate the hydrate formed from the electrolyte,
a hydrate former means associated with the store means and being operative to intermix halogen gas from the cell with electrolyte from the store means and from the cell,
a gas space means being maintained at the top of the store means with the hydrate former exhausting into the proximity of the gas space, said gas space means being operative to minimize transfer of liquid from the store to the cell,
exit conduit means near the top of the store means for transmitting gas-fluid to the cell,
second exit conduit means near the bottom of the store means for circulating filtered electrolyte to the battery system.

10. The invention of claim 9 wherein,
said battery is a zinc-chlorine battery using an aqueous zinc chloride electrolyte.

* * * * *

UNITED STATES PATENT AND TRADEMARK OFFICE
CERTIFICATE OF CORRECTION

PATENT NO. : 4,400,446
DATED : August 23, 1983
INVENTOR(S) : Thomas H. Hacha

It is certified that error appears in the above-identified patent and that said Letters Patent is hereby corrected as shown below:

Column 1, line 43, "reference" should be --references--.

Column 3, line 50, "and" should be --are--.

Column 8, line 34, "circulating" should be --recirculating--.

Signed and Sealed this

First Day of November 1983

[SEAL]

Attest:

GERALD J. MOSSINGHOFF

Attesting Officer     Commissioner of Patents and Trademarks